UNITED STATES PATENT OFFICE.

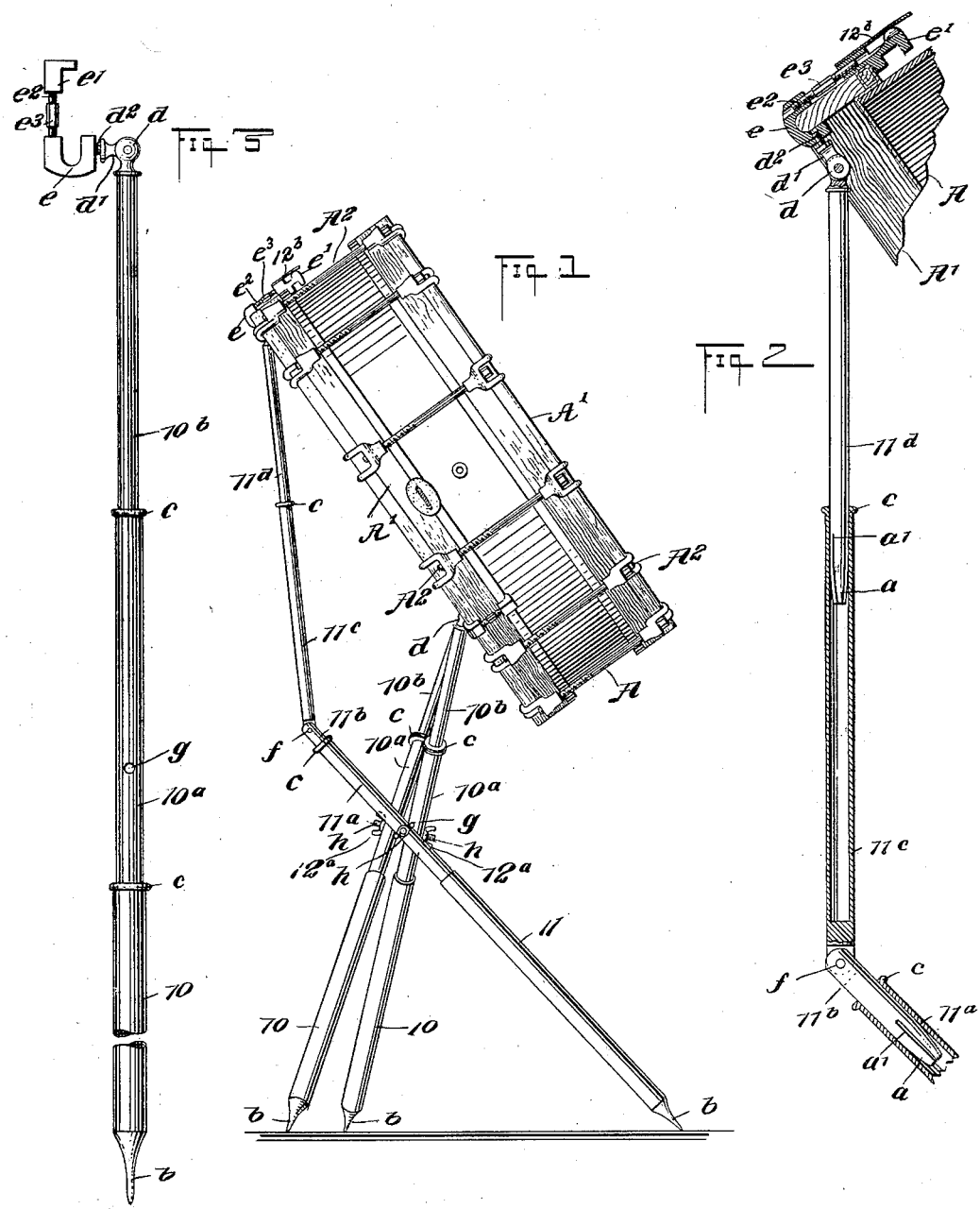

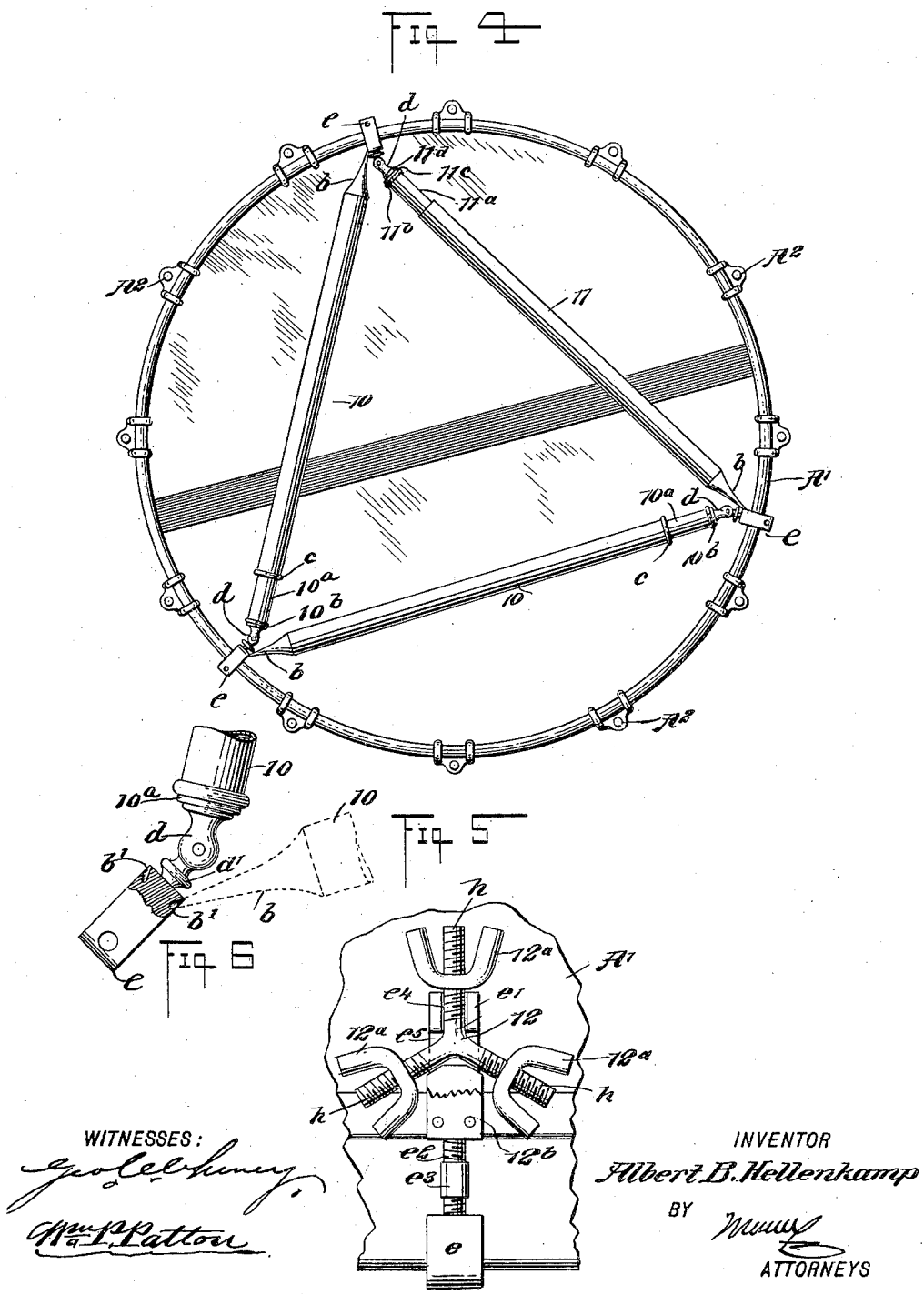

ALBERT B. HELLENKAMP, OF CLEVELAND, OHIO.

DRUM-STAND.

SPECIFICATION forming part of Letters Patent No. 706,937, dated August 12, 1902.

Application filed April 25, 1901. Serial No. 57,435. (No model.)

*To all whom it may concern:*

Be it known that I, ALBERT B. HELLENKAMP, a citizen of the United States, and a resident of Cleveland, in the county of Cuyahoga and State of Ohio, have invented a new and Improved Drum-Stand, of which the following is a full, clear, and exact description.

This invention has for its object to provide a novel simple device for supporting a drum at any desired height from the ground or floor whereon it rests and afford means to readily adjust parts of the stand, so as to give the drum carried by the stand any desired inclination, a further object being to provide a drum-stand which is light, strong, neat in appearance, and is contractible in its legs, that are connectible with a drumhead-hoop at one end of each leg and adapted for secured location within the space bounded by the projecting rim of the drum-hoop.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view of the improved stand and of a drum held thereon. Fig. 2 is a sectional side view of a portion of a drum and a partly-sectional view of a leg of the improved stand connected with the drum-hoop. Fig. 3 is a side view of one of the stand-legs differing in length from the one shown in Fig. 2. Fig. 4 is a rear view of the drum and of the supporting-stand therefor in folded condition. Fig. 5 is an enlarged side view of a portion of the drum-hoop and of a novel detail of the stand and which when not in service is held upon the hoop, and Fig. 6 is an enlarged partly-sectional side view showing means for holding the legs of the drum-stand in folded condition.

The improved stand in brief comprises three legs having telescoping members which permit their individual extension and also their contraction to a length which adapts them to be disposed in triangular order upon one head of the drum when not in use as a stand. Furthermore, provision is made to removably secure one end of each leg upon a hoop of the drum near its free edge. In arranging the stand for use the legs are suitably extended and crossed, so as to contact with each other, said legs being held connected as a tripod by a suitable securing device.

The drum may be of any preferred construction and, as usual, is provided with heads held in position at the ends of the drum-shell A by cylindric hoops A', that are drawn toward each other and held in clamping adjustment by the bolts A², that are furnished with hooked heads and nuts on their ends for engagement with the edges of the hoops, as usual.

The three legs which are coacting members of the improved drum-stand each consist of a plurality of tubular sections formed of any preferred metal. Two of the legs for the stand are individually composed of three sections 10 10ª 10ᵇ and the third leg of five sections 11 11ª 11ᵇ 11ᶜ 11ᵈ, that give said leg increased length. The tubular sections 10, which are similar parts of the two shorter legs, are of such internal diameter as to adapt them to respectively receive a middle section 10ª, and said middle section for each of the paired legs in turn forms a casing for the upper leg-section 10ᵇ when said parts are slid together, so as to shorten the legs as occasion may require. The three sections 10 10ª 10ᵇ of each of the similar legs have close-fitted engagement one within the other, respectively, and to adapt them for convenient insertion at their engaging ends the extremities of the leg-sections which enter complementary ones of greater diameter are tapered sufficiently to permit this to be readily effected, and it is to be understood that the insertible end portions of the leg-sections of the three legs forming the improved drum-stand are tapered, as clearly shown at $a$ in Fig. 2. Each tapered end $a$ of a leg-section is longitudinally slitted a short distance, so as to render these end portions slightly resilient, and each of the slitted ends may be slightly increased in diameter by correspondingly spreading the two walls formed by the opposite slits $a'$, which will afford such frictional contact between the split ends and tubular leg-sections that receive them as to require some manual force to slide the leg-sections one within the other, whereby accidental contraction of the length of either leg is prevented.

The ends of the leg-sections 10 that are lowermost in service have a tapering point $b$ formed on each one, which should be of metal hard enough to insure durability, and at the open ends of each of the leg-sections 10 $10^a$ a peripheral reinforcing-rib $c$ may be produced, which affords finish thereto as well as strength. The normally upper section $10^b$ of each of the shorter legs and which has a close sliding fit within a respective middle section $10^a$ may be advantageously formed of tubular material to render the same light without impairing its strength, and at the end opposite that which enters the leg-section $10^a$ a headpiece $d$ is formed or secured, from which projects the arm $d'$, terminating in a threaded bolt end $d^2$.

The leg composed of the telescoping sections 11 $11^a$ $11^b$ $11^c$ $11^d$ differs somewhat in construction from the pair of legs that have been described, as will be now explained.

The lower leg-section 11 is similar in size and form to the leg-sections 10 and terminates in a tapering end $b$ for non-slipping engagement with a floor or the like. The leg-section $11^a$, which is placed within the upper end of the section 11, may be of reduced length as compared with the other leg-sections, and the end of the section $11^b$ exterior of the leg-section $11^a$ is hinged upon the adjacent end of the leg-section $11^c$, as shown at $f$ in Figs. 1 and 2. In the hollow leg-section $11^c$ the leg-section $11^d$ is held to slide, and, as shown in Fig. 2, the insertible ends $a$ of the leg-sections $11^a$ and $11^d$ are tapered and longitudinally slitted to adapt them for proper frictional engagement within the leg-sections into which they are inserted, as before mentioned. At the normally upper end of the leg-section $11^d$ a headpiece $d$ is formed or secured having a lateral arm $d'$ thereon, terminating in a threaded bolt end $d^2$, this detail being similar to the heads $d$ on the paired legs hereinbefore described.

An adjustable clamp is provided for each leg of the drum-stand, and, as shown in Fig. 3, each of the clamps which are to engage with the upper ends of the leg-sections $10^b$, respectively, comprises a U-shaped block $e$, perforated laterally in one leg and threaded therein to receive the threaded bolt end $d^2$, which effects a secure rockable connection of the clamp member $e$ upon the headpiece $d$ at one side thereof. An L-shaped clamp member or block $e'$ is adjustably secured upon the outer member of the U-shaped block $e$ by an adjusting-bolt $e^2$, having a right-hand thread on one end and a left-hand thread formed on the opposite end, said threaded ends engaging within correspondingly-threaded perforations in the blocks $e$ and $e'$, and, as represented, an angular formation $e^3$ is formed at the center of the bolt-body $e^2$ to afford means for conveniently turning the bolt with a suitable tool.

It will be seen that the adjustment of the bolts $e^2$ affords means for securing the clamping devices held on the upper ends of the stand-legs in place upon the lower hoop of a drum, as shown in Figs. 1 and 2, by gripping the same transversely, and in arranging the clamps for effective service they are evenly spaced apart upon said hoop A', as shown in Fig. 4. The legs when secured upon the drum-hoop A' are relatively disposed so as to position the two shorter ones oppositely and the longer leg intermediately and at an equal distance from the shorter legs.

The leg-sections 10 $10^a$ $10^b$ of the shorter legs are extended of an equal length, and in the middle section $10^a$ of each of said legs a transverse perforation $g$ is formed at an equal distance from the point $b$ on the end of each section 10. The remaining leg is also perforated in its section $11^a$ at a point $g$, which will dispose said perforation close to the like perforations in the leg-sections $10^a$.

A three-limbed coupling 12 is furnished to hold the legs of the stand securely joined together when it is erected, and, as best shown in Fig. 5, said coupling comprises three screw-bolts $h$, that radiate from a common center, where they are integrally joined together, and the screw-bolt formations are spaced apart an equal distance. Upon each screw-threaded limb or bolt $h$ a preferably winged nut $12^a$ is screwed after the bolt-bodies are properly engaged with the leg-sections $10^a$ and $11^a$. The longer leg is now extended by outward movement of its sections, so as to permit the lower section 11 and the next section $11^a$, which is connected therewith, to incline sufficiently so as to dispose the point $b$ of the lower section 11 forwardly and nearly in a vertical plane with the advanced lower portion of the upper drum-hoop A', as is clearly shown in Fig. 1. The coupling device is now connected with the three legs of the stand by insertion of a screw-bolt $h$ through the perforation $g$ in an appropriate leg-section, when the winged nuts $12^a$ are removed, and said nuts by their screwed engagement with the end portions of the screw-bolts which project outside of the legs and the clamping adjustment of said nuts serve to draw the three legs close together in a substantial manner. The three legs arranged as described afford a triangular base for support of the drum, which by proper extension of the lower leg members 10, 10, and 11 may be properly spread apart and will sustain the drum in a reliable manner.

It will be noticed that the two leg-sections $11^c$ and $11^d$ when extended for proper support of the rear edge of the drum-hoop A' are together disposed in a nearly vertical plane above the joint $f$, and obviously the slidable adjustment of the uppermost section $11^d$ into or out of the leg-section $11^c$ will correspondingly alter the degree of inclination given to the heads of the drum.

The clamp provided for the upper end of the leg-section $11^d$ is somewhat different from those provided to engage with the headpieces on the leg-sections $10^b$, as the top clamping-piece $e'$ is longer than the clamping-pieces $e'$, hereinbefore described, and, as shown in Fig. 5, the upper portion of the clamping piece or jaw $e'$ is longitudinally grooved, as at $e^4$, for reception of one bolt-body $h$ and transversely channeled, as at $e^5$, to receive the central portion of the three-limbed coupling-bolt. A plate-spring $12^b$ is secured by one end on the outer face of the clamping-piece $e'$, near its lower end, said spring extending its free portion over the upper end of the limb to which it is attached.

When the coupling device 12 is removed from the legs of the drum-stand to permit said legs to be contracted and folded upon the drumhead for convenient transportation, said three-limbed coupling is introduced within the groove $e^4$ and channel $e^5$ beneath the plate-spring $12^b$, so that the pressure of said spring will retain the three-limbed coupling in place, adapted for quick removal by proper handling, but not liable to become accidentally displaced. In Fig. 6 are shown two opposite perforations $b'$, diagonally formed in opposite corners of one of the blocks $e$, and it is to be understood that such diagonal perforations are formed in each U-shaped block whereon a headpiece $d$ of a stand-leg is held to rock.

When the improved stand is to be held in contracted form on the drum at the end to which it is secured, the sections of all the legs are slid so as to reduce their length sufficiently to permit them to be disposed triangularly, as shown in Fig. 4. Then the sections of each leg are extended sufficiently to enable the extremity of a pointed end $b$ on each leg to be introduced within an opposite perforation $b'$, and the legs will thus be held from contact with the drumhead and will remain so adjusted until they are manipulated for release.

It will be seen that the relative disposal of the telescoped legs as described serves to retain them closely folded near the head of the drum in the recess afforded by the projected edge of the clamping-hoop $A'$, and by this means they are protected against injury when the drum is carried or is seated upon the clamps that are engaged with the edge of said hoop.

As the device either in folded or extended condition is light and substantial, as well as comparatively inexpensive, and also is convenient to erect or reduce to compact form for folded connection with the drum it is to support when in use, it will be obvious that it is well adapted for general use by those requiring a support for a drum while it is used as a musical instrument.

Having thus fully described my invention, I claim as new and desire to secure by Letters Patent—

1. A drum-stand, comprising a plurality of longitudinally-adjustable legs, and clamping devices for pivotally connecting one end of each leg with a drum-hoop, the said legs when in contracted position being adapted to fold upon the drum, inside of the hoop, the clamping devices being arranged to engage and hold the legs in the folded position.

2. A drum-stand, comprising a plurality of longitudinally-adjustable legs, and a clamping device on one end of each leg, adapted to be detachably secured on the edge of a hoop on a drum.

3. A drum-stand, comprising three longitudinally extensible and contractible legs, means for holding said legs crossed intermediate of their ends, when the legs are extended, and clamping devices for securing said legs at one end on the hoop of a drum so as to flex thereon, the said legs when in the contracted position being arranged to fold upon the drum and adapted to be held in folded position by engagement with the clamping devices.

4. A drum-stand, comprising three legs, each composed of a plurality of telescoping sections, a jointed clamping device on the outer end of the top section of each leg, and a coupling device adapted to hold the legs crossed intermediately of their ends.

5. A drum-stand, comprising three legs, two of said legs having three sections and one of said legs five sections, all the legs having their sections telescopically engaged, a point on the lower end of each leg, a jointed clamping device on the upper end of each leg, and a coupling device adapted to hold the legs crossed intermediately of their ends.

6. A drum-stand, comprising three legs, two of said legs having three sections and the other leg five sections, two intermediate sections of the longer leg being hinged together, all the legs having their sections telescopically engaged, a point on the lower end of each leg, and a coupling device adapted to hold the legs crossed intermediately of their ends.

7. The combination with a hoop on one end of a drum, of a three-legged stand, the legs of which are formed of sections telescopically engaged, a clamping device on one end of each leg, said clamping devices being adapted to be secured on the drum-hoop, and a coupling device adapted to hold the legs crossed when the stand is erected to form a tripod, said legs in contracted form being adapted to fold flat upon the drum inside of the hoop to which they are secured.

8. The combination with a hoop on one end of a drum, of a stand comprising a plurality of longitudinally-adjustable legs, and means for connecting one end of the legs with the drum-hoop, the said legs when in contracted form being adapted to fold upon the drum inside of the hoop.

9. In a drum-stand of the character described, the three telescoping legs, a clamping device for each leg, adapted to secure an end of the leg upon the hoop of a drum, a securing device adapted to hold the legs crossed when the frame is erected in tripod form, and a clamping-spring on one clamping device for holding the leg-securing device when the stand is not in use.

10. The combination with a hoop on one end of a drum, of a stand comprising three adjustable legs, a clamping device on one end of each leg, the said clamping devices being secured to the hoop at equal distances apart, the said legs being mounted to rock on the clamping devices, and adapted when in contracted form to fold upon the drum inside of the hoop, and means for holding the legs in the folded position.

11. A drum-stand, comprising a plurality of longitudinally-adjustable legs, and clamping devices adapted to be secured to a drum-hoop and on which one end of the legs are mounted to rock, the other end of each leg being pointed, the said legs being adapted when in contracted form to fold upon the drum inside of the hoop, and the clamping devices being provided with recesses adapted to receive the pointed ends of the legs.

In testimony whereof I have signed my name to this specification in the presence of two subscribing witnesses.

ALBERT B. HELLENKAMP.

Witnesses:
FRANK BECKER,
J. G. SAUTTER.